United States Patent
Peng et al.

(10) Patent No.: US 6,933,993 B2
(45) Date of Patent: Aug. 23, 2005

(54) METHOD OF FORMING A COLOR FILTER LAYER ON AN ARRAY SUBSTRATE AND DEVICE THEREOF

(75) Inventors: Huo-Long Peng, Taichung (TW); Chaung-Ming Chiu, Taipei (TW); Kuang-Lung Kuo, Hsinchu (TW); Jing-Yi Chang, Hsinchu (TW); Tzu-Seng Yang, Hsinchu (TW)

(73) Assignee: Toppoly Optoelectronics Corp. (TW)

( * ) Notice: Subject to any disclaimer, the term of this patent is extended or adjusted under 35 U.S.C. 154(b) by 0 days.

(21) Appl. No.: 10/438,987

(22) Filed: May 16, 2003

(65) Prior Publication Data

US 2004/0227873 A1 Nov. 18, 2004

(51) Int. Cl.⁷ .................. G02F 1/1335; G02F 1/1343
(52) U.S. Cl. .................. 349/106; 349/110; 349/141; 430/7
(58) Field of Search .................. 349/106, 110, 349/141; 430/7

(56) References Cited

U.S. PATENT DOCUMENTS

| | | | | |
|---|---|---|---|---|
| 5,400,157 A | * | 3/1995 | Won | 349/152 |
| 5,721,599 A | * | 2/1998 | Cheng | 349/106 |
| 6,143,450 A | * | 11/2000 | Sobue et al. | 430/7 |
| 6,183,917 B1 | * | 2/2001 | Sakamoto et al. | 430/7 |
| 6,501,527 B1 | * | 12/2002 | Hirose et al. | 349/155 |
| 6,697,142 B2 | * | 2/2004 | Ashizawa et al. | 349/141 |
| 6,830,855 B2 | * | 12/2004 | Kiguchi et al. | 430/7 |
| 6,862,058 B2 | * | 3/2005 | Ikeno et al. | 349/114 |

* cited by examiner

*Primary Examiner*—Huyen Ngo
(74) *Attorney, Agent, or Firm*—Michael Bednarek; Pillsbury Winthrop Shaw Pittman LLP

(57) ABSTRACT

The present invention provides a color liquid crystal display device in which a color filter layer is formed on an array substrate. The array substrate includes a scan line and a data line forming a pixel, on which a thin film transistor is formed, and a pixel electrode is connected to the thin film transistor. A black matrix layer is formed on the array substrate. A black matrix frame is formed around the periphery of the black matrix layer. A color filter layer is formed on the array substrate and the black matrix layer, and extends to cover the black matrix frame.

10 Claims, 4 Drawing Sheets

METHOD OF FORMING A COLOR FILTER LAYER ON AN ARRAY SUBSTRATE AND DEVICE THEREOF

FIELD OF INVENTION

The present invention relates to a color liquid crystal display device in which a color filter layer and a black matrix layer are formed on an array substrate.

BACKGROUND OF THE INVENTION

A typical liquid crystal display device includes an upper substrate, a lower substrate, and a liquid crystal layer between them. The upper substrate has a color filter layer and a common electrode. The lower substrate, referred to as an array substrate, has a switching unit and a pixel electrode. The upper and lower substrates are individually fabricated and then assembled together. Some heating steps, e.g. pre-baking, exposure or post-exposure baking, during the process of forming the upper substrate may lead to deformation of the upper substrate, so that misalignment of the upper and lower substrates may happen during assembly. However, this problem may be solved and the producing process may be simplified by putting a color filter layer and a black matrix layer on the array substrate. Besides, the brightness may be increased since the aperture is improved.

FIGS. 1a and 1b are illustrative diagrams showing a part of an array substrate with a color filter layer according to the prior art. A scan line 500 and a data line 600 intersect with each other on the array substrate 100. A thin film transistor 800 is formed near the intersection. A pixel electrode 900 is formed on a pixel 700 defined by the scan line 500 and the data line 600. A color filter layer 400 lies beneath the pixel electrode 900. A black matrix layer 200 is formed along the scan line 500 to cover the thin film transistor 800. As shown in FIG. 2, a light-blocking black matrix frame 300 is typically formed on the periphery 100a of the display area of the substrate 100 to block light leakage from the backlight.

As shown in FIG. 3, the thickness of the color filter layer 400 formed on the array substrate 100 according to the prior art is different from that of the black matrix frame 300 in the display area. Accordingly, the liquid crystal region 2 over the black matrix frame 300 is thicker than the liquid crystal region 1 over the color filter layer 400, so that gray leveling of light leakage may occur in the liquid crystal region 2. There may be circuits (e.g. driver IC) under the black matrix frame 300 in a low temperature polysilicon (LTPS) LCD. The thickness of the black matrix frame 300 may have to be increased to abate the circuit loading if the dielectric characteristic of the black matrix material is not good. However, increasing the thickness of the black matrix frame depends on the characteristics of the materials, and may be limited since the black matrix layer also exists in the pixel; the display device may then malfunction or have inferior performance.

To eliminate gray leveling of light leakage, there has to be a unique thickness of different liquid crystal regions. Nevertheless, the size of the spacer 1001, sealed by a sealant 1003, must also be modified if the thickness of the color filter layer 400 or the black matrix frame 300 is altered to meet process or product requirements. Then, the producing process would be more complicated. Therefore, a new liquid crystal display device with a simpler producing process is needed to overcome the above-mentioned drawbacks.

SUMMARY OF THE INVENTION

One aspect of the present invention provides a color liquid crystal display device. The color liquid crystal display device includes an array substrate, a black matrix layer, a black matrix frame around the periphery of the black matrix layer, and a color filter layer. The feature of the device is that the color filter layer extends to cover the black matrix frame, so the difference in thickness of the liquid crystal regions over the color filter layer and over the black matrix frame is decreased. The red, green and blue color filters covering the black matrix frame may be an additional dielectric layer abating the circuit loading, and the thickness of the color filter layer is flexible. Accordingly, the circuit loading can meet standards and the device can perform normally without altering the cell gap. In the mean time, the above-mentioned drawbacks are overcome, and the producing process is simplified. The array substrate includes a scan line and a data line forming a pixel, on which a thin film transistor is formed; a pixel electrode is connected to the thin film transistor. The color filter layer includes red, green and blue filters, and is formed on the array substrate and the black matrix layer.

Another aspect of the present invention provides a method of forming a color filter layer on an array substrate. The method includes the following steps. An array substrate is formed. A black matrix layer is formed on the array substrate. A black matrix frame is formed around the periphery of the black matrix layer. A color filter layer is formed on the array substrate and the black matrix layer. The feature of the device is that the color filter layer extends to cover the black matrix frame, so the difference in thickness of the two liquid crystal regions over the color filter layer and over the black matrix frame is decreased. The red, green and blue color filters covering the black matrix frame may be an additional dielectric layer abating the circuit loading, and the thickness of the color filter layer is flexible. Accordingly, the circuit loading can meet standards and the device can perform normally without altering the cell gap. In the meantime, the above-mentioned drawbacks are overcome and the producing process is simplified. The array substrate includes a scan line and a data line forming a pixel, on which a thin film transistor is formed; a pixel electrode is connected to the thin film transistor.

BRIEF DESCRIPTION OF THE DRAWINGS

For a more complete understanding of the present invention, reference is now made to the following descriptions taken in conjunction with the accompanying drawings. Similar notation number across all figures represents similar element.

DETAILED DESCRIPTION

Figure 4:
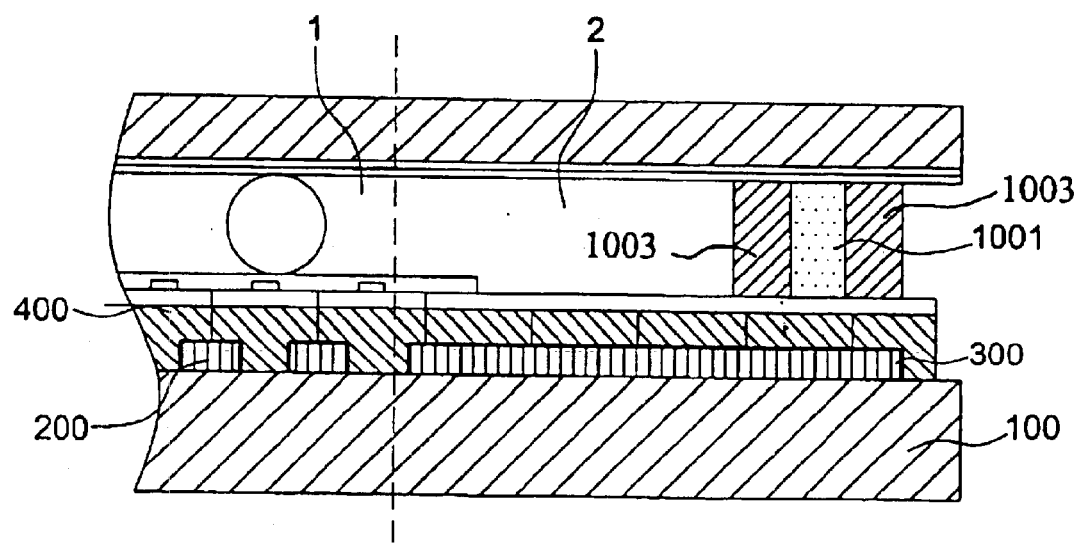
FIG. 4 is a cross-sectional diagram of a color liquid crystal display device according to the present invention.

A color liquid crystal display device is provided as shown in FIG. 4. The device includes an array substrate 100 and a black matrix layer 200 formed on the array substrate 100. A black matrix frame 300 is formed around the periphery of the black matrix layer 200 to prevent light leakage from the backlight. A color filter layer 400 is formed on the array substrate 100 and the black matrix layer 200. The feature of the device is that the color filter layer 400 extends to cover the black matrix frame 300, so the difference in thickness between the liquid crystal region 1 and the liquid crystal region 2 is decreased. The red, green and blue color filters covering the black matrix frame 300 may be an additional dielectric layer abating the circuit loading, and the thickness of the color filter layer 400 is flexible. Accordingly, the circuit loading can meet standards and the device can perform normally without altering the cell gap. In the meantime, the above-mentioned drawbacks are overcome, and the producing process is simplified.

Figure 1A:
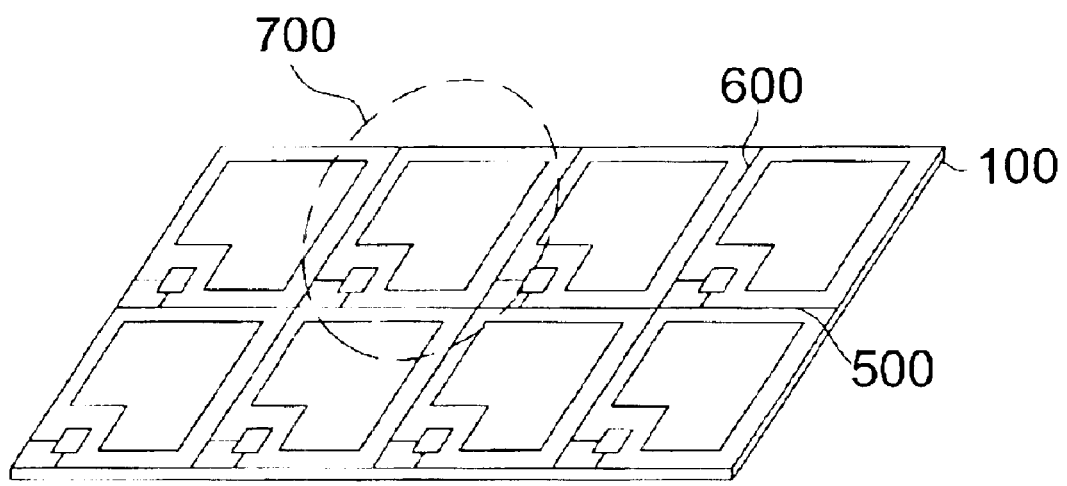
FIGS. 1a and 1b are illustrative diagrams showing a part of an array substrate with a color filter layer according to the prior art.
Figure 1B:
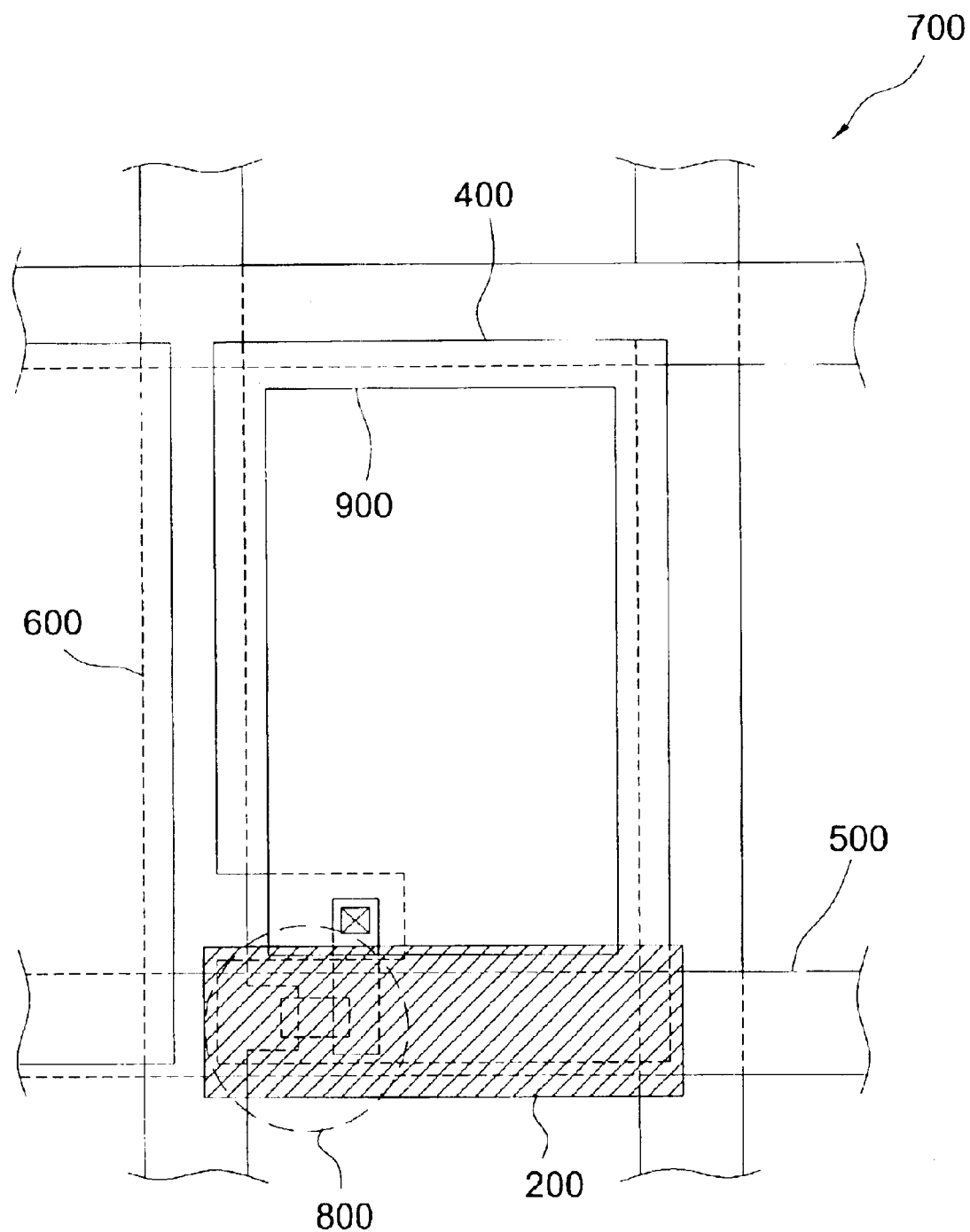
Figure 2:
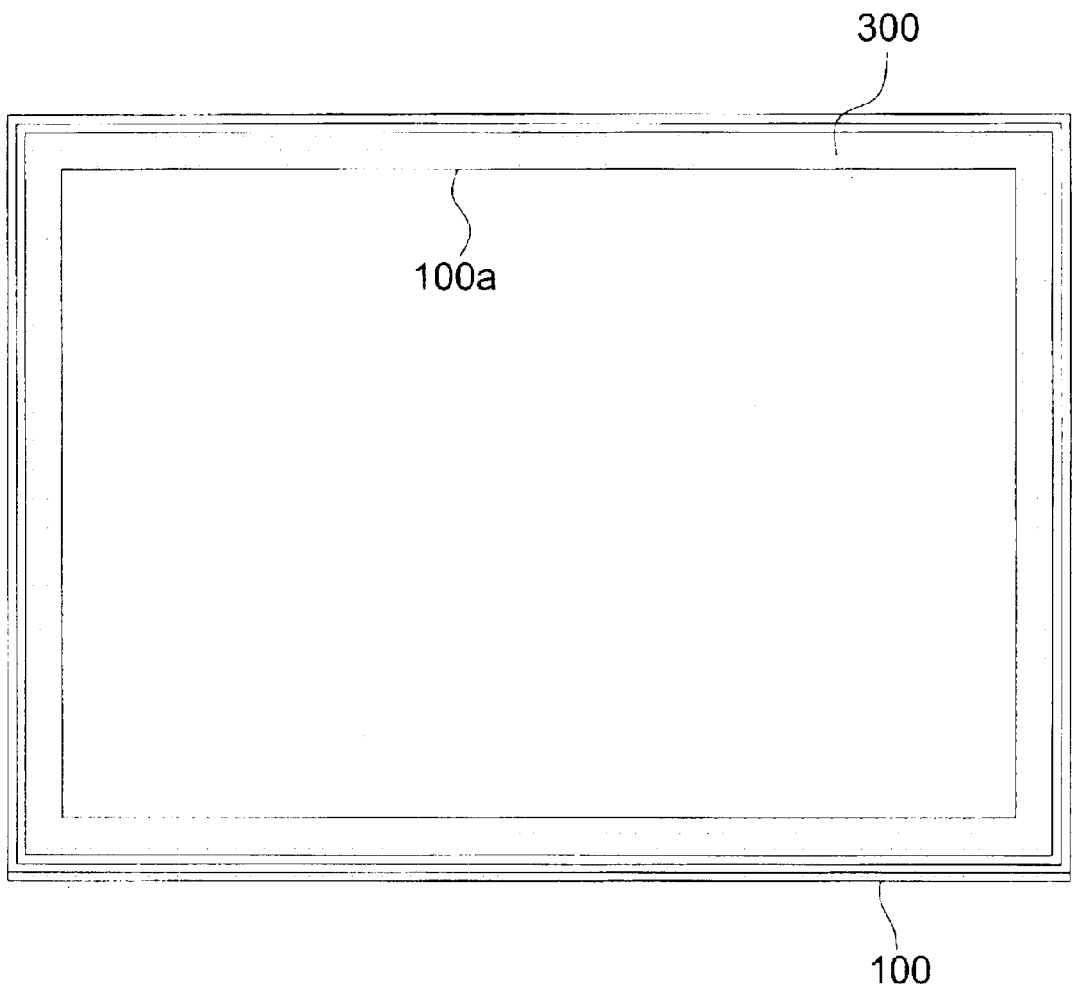
FIG. 2 is an illustrative diagram showing a part of a liquid crystal display device according to the prior art.
Figure 3:
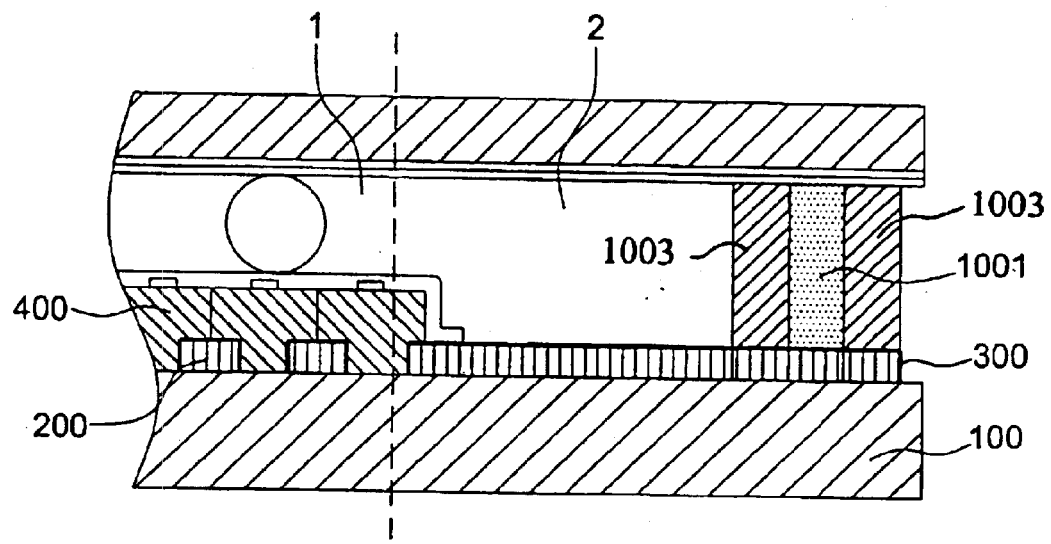
FIG. 3 is a cross-sectional diagram of a color liquid crystal display device according to the prior art.

As shown in FIG. 1, the array substrate 100 includes a scan line 500 and a data line 600 forming a pixel 700, on which a thin film transistor 800 is formed to be a switch; a pixel electrode 900 is connected to the thin film transistor 800.

A method of forming a color filter layer 400 on an array substrate 100 is provided with reference to FIG. 4. An array substrate 100 is formed. A black matrix layer 200 is formed on the array substrate 100. A black matrix frame 300 is formed around the periphery of the black matrix layer 200. A color filter layer 400 is formed on the array substrate 100 and the black matrix layer 200. The feature of the device is that the color filter layer 400 extends to cover the black matrix frame 300, 50 the difference in thickness between the liquid crystal region 1 and the liquid crystal region 2 is decreased. The black matrix layer 200 can be made of resin-based material. The red, green and blue color filters covering the black matrix frame 300 may be an additional dielectric layer abating the circuit loading, and the thickness of the color filter layer 400 is flexible. Accordingly, the circuit loading can meet standards and the device can perform normally without altering the cell gap. In the mean time, the above-mentioned drawbacks are overcome, and the producing process is simplified.

While this invention has been described with reference to the illustrative embodiments, these descriptions should not be construed in a limiting sense. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

What is claimed is:

1. A color liquid crystal display device, comprising:
   an array substrate;
   a black matrix layer formed on said array substrate;
   a black matrix frame formed around a periphery of the black matrix layer; and
   a color filter layer formed on said array substrate and said black matrix layer, wherein said color filter layer extends to cover said black matrix frame at least through an entirety of a liquid crystal layer.

2. The color liquid crystal display device of claim 1, wherein said array substrate comprises:
   a substrate;
   a scan line and a data line formed on said substrate to define a pixel;
   a thin film transistor formed on said pixel; and
   a pixel electrode connected to said thin film transistor.

3. The color liquid crystal display device of claim 1, wherein said color filter layer comprises a red filter, a green filter, and a blue filter.

4. The color liquid crystal display device of claim 1, further comprising a glass substrate opposite said array substrate, the liquid crystal disposed in a space between said glass substrate and said array substrate.

5. The color liquid crystal display device of claim 1, wherein said color filter layer extends to completely cover said black matrix frame.

6. A method of forming a color filter layer on an array substrate, comprising:
   forming an array substrate;
   forming a black matrix layer on said array substrate;
   forming a black matrix frame around a periphery of the black matrix layer; and
   forming said color filter layer on said array substrate and said black matrix layer,
   wherein said color filter layer extends to cover said black matrix frame at least through an entirety of a liquid crystal layer.

7. The method of claim 6, said forming said array substrate comprising:
   forming a scan line and a data line on a substrate to define a pixel;
   forming a thin film transistor on said pixel; and
   forming a pixel electrode connected to said thin film transistor.

8. The method of claim 6, wherein said black matrix layer is of a resin-based material.

9. The method of claim 6, wherein said color filter layer comprises a red filter, a green filter, and a blue filter.

10. The method of claim 6, wherein said color filter layer extends to completely cover said black matrix frame.

* * * * *